United States Patent Office 2,753,868
Patented July 10, 1956

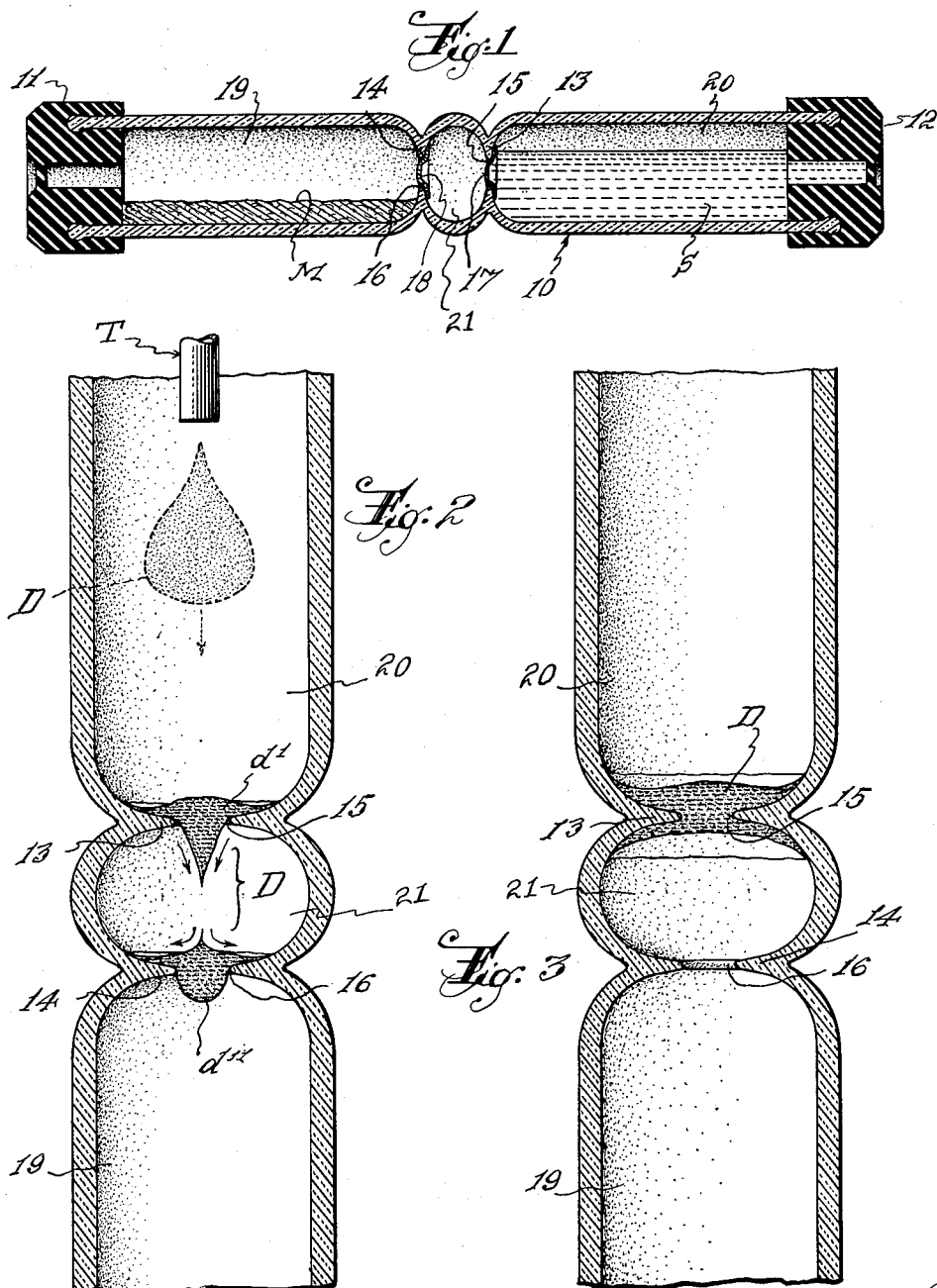

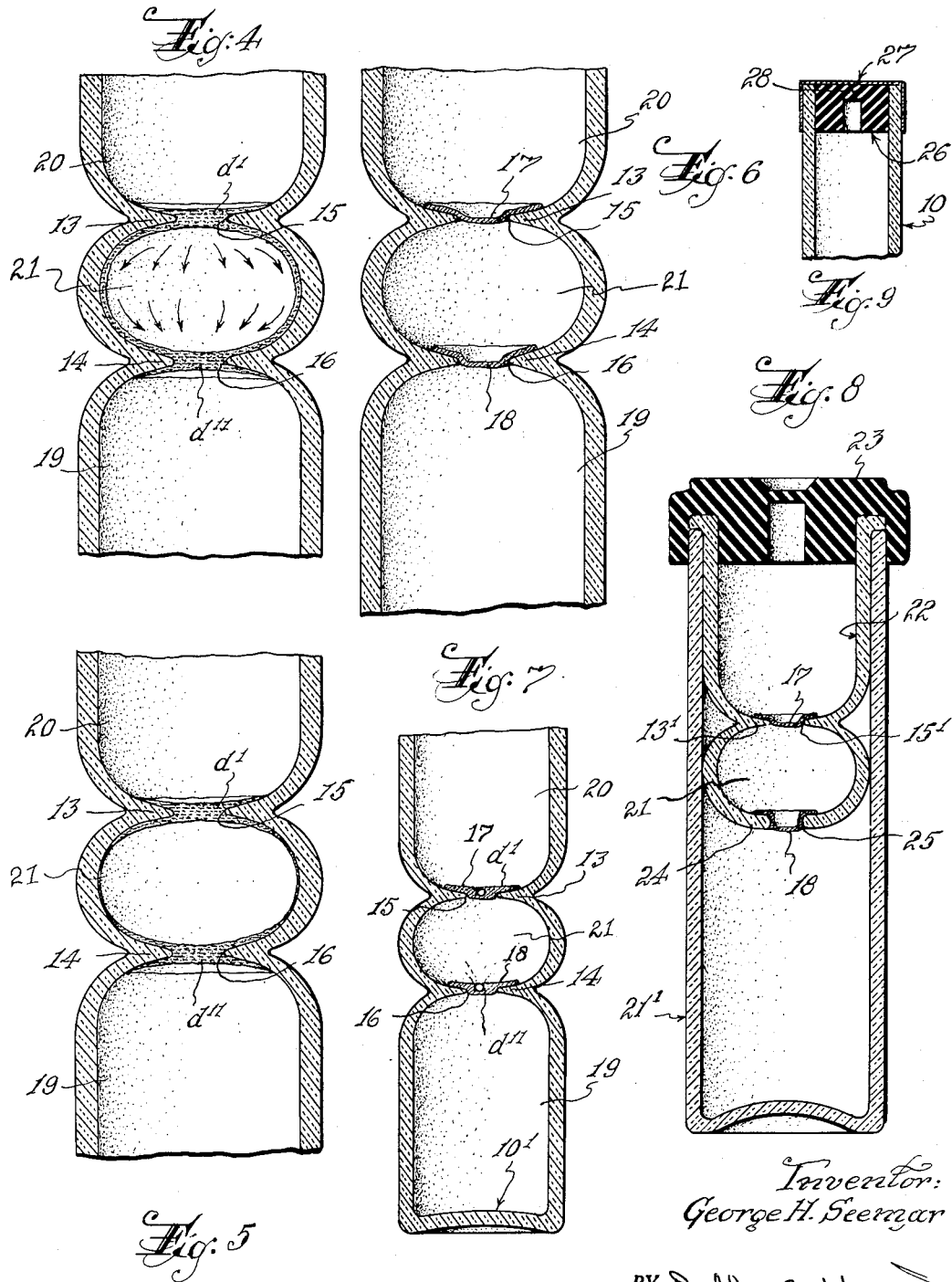

2,753,868

PLURI-COMPARTMENT CONTAINER WITH DOUBLE-SEALED PARTITIONING CHAMBER

George H. Seemar, Chatham, N. J.

Application July 21, 1952, Serial No. 300,010

11 Claims. (Cl. 128—272)

The invention relates in general to containers for pharmaceutical products and has particular reference to unitary pluri-compartment containers of the kind disclosed in my earlier application Ser. No. 132,648, now matured into Patent No. 2,559,231, dated July 3, 1951, and application Ser. No. 143,189, now matured into Patent No. 2,568,029, dated September 18, 1951, for use in separately packaging the related ingredients of hypodermic injection charges.

In my above-cited containers, each of the various embodiments of the invention includes a container body which is divided into separate, temporarily isolated compartments to contain the respective ingredients of a hypodermic injection charge, pending intentional admixture, by a single partitioning wall integral with said body and having a needle-penetrable passage sealed hermetically by a needle-puncturable membrane or septum composed of a nitrocellulose product known as "pyroxylin."

During the period when my previous inventions were evolved, pyroxylin was considered by me to be the ideal material for septum fabrication, primarily because it was far superior to rubber, or any other medically acceptable material theretofore used for that purpose, in the very important ability to adhere with sufficient tenacity to glass, which is preferred for the construction of the body of the containers. Rubber, for instance, will not adhere to glass securely enough to insure against failure of the adhesive union under certain conditions commonly encountered in practical use, such as the heat of sterilization prior to loading of the ingredient compartments. During sterilization, a rubber septum fabricated with pure latex simply curls up from the glass surfaces and falls away from its applied position.

Pyroxylin proved to be satisfactory in its adhesive affinity for glass, but it was found, after extensive practical use of containers sealed with that material, that it had at least one defect which made search for a more perfectly suitable septum-forming material necessary. That defect is its permeability to vapor transmission under certain conditions. This is a serious matter in a container in which the drug, or other medicament, will be rendered unfit for the intended use if it comes into contact with its solvent vehicle prematurely. It is a prerequisite to safe and efficacious use of any hypodermically administered medicament that the act of admixture with its solvent vehicle shall occur immediately preceding administration.

There is another condition of use of the containers which has been a matter of grave concern and that is the danger of rupture of a sealing septum of any selected material under the thrust of vapor pressure which is generated in the solvent compartment of a loaded container when subjected to the heat of tropical climates or storage in unrefrigerated, unventilated places.

With these considerations in mind, it is the primary object of the present invention to improve upon my earlier containers in at least two vital respects, viz: first, to provide a medically acceptable material for fabrication of the sealing septa that is completely impervious to vapor transmission after solidification into its final state and thus is suitable for use in any of my earlier, single-septum containers; and, second, to provide a physical structure of the container body itself which will permit use of any sufficiently adhesive, medically acceptable material for septum fabrication.

A further object is to devise a modification of the "drop method" of septum installation disclosed in my prior Patent No. 2,559,231 which is peculiarly adapted to the improved container structure.

The above and other objects, features and advantages of the present invention will be more fully understood from the following specific description when considered in connection with the accompanying drawings, in which:

Fig. 1 is a longitudinal cross-sectional view of a loaded container constructed in accordance with the invention.

Fig. 2 is a fragmentary, large scale, longitudinal section of an uncapped container body standing on end for the first step in the "drop method" of sealing septa installation, showing the first stage of septa formation when using high viscosity innocuous material; Fig. 3 is a similar view, showing the first stage of the first step when low viscosity material is used; Fig. 4 is a similar view showing the second stage in the use of low viscosity material; Fig. 5 is a similar view showing the third stage when using low viscosity material; and Fig. 6 is a similar view showing the final stage when using high viscosity material.

Fig. 7 is a fragmentary longitudinal section, on a smaller scale, of a modified container having one end permanently closed to form a flat-bottomed bottle, showing the sealing septa undergoing equalization of air pressure in the pressure transmitting chamber and ingredient compartments while the medically acceptable material is still in a soft, plastic state.

Fig. 8 is a longitudinal section of a further modified form of container wherein the two ingredient compartments are provided by cooperative telescoped sections, one being an outer bottle-type section and the other being an inner thimble-shaped section.

Fig. 9 is a fragmentary side elevation of a tubular container having a modified form of end sealing means constructed in accordance with the present invention.

Referring now in detail to the drawings, wherein like reference characters designate corresponding parts in the several views, Fig. 1 illustrates one embodiment of the present invention in its loaded and sealed condition ready for supply to the dispensing pharmacies. In this embodiment, the body 10 of the container preferably is in the form of an open-ended cylindrical glass tube and is adapted to have its ends closed by removable, needle-puncturable caps 11 and 12 of a medically acceptable material, such as rubber. These caps are standard articles of manufacture readily available on the market, so they will not be described in detail.

The term "medically acceptable material" as used herein is to be understood to mean a material or chemical composition which fully meets the medical requirements for use in a needle-puncturable sealing septum for containers of hypodermic injection ingredients, which requirements include non-toxicity, non-frangibility and chemical inertness in contact with any of the ingredients. Rubber is a material in this category, but, as has already been pointed out, has proven to be unsuitable for the formation of a fixed sealing septum in interposed relation to the separate ingredient packaging compartments of a glass container body due to its poor adhesive quality and to the fact that it is pervious to vapor transmission.

After continuous research and experimentation with a great variety of likely medically acceptable materials, it has been discovered that vinyl copolymer is the best presently known chemical composition for my purpose. It adheres even more tenaciously to glass surfaces than pyroxylin and is susceptible to the "drop method" of septum installation when dissolved in a highly volatile solvent. Moreover, vinyl copolymer is completely inert to any medicaments which are likely to be injected into the human system; is more flexible and resilient than pyroxylin; is colorless and can be sterilized with no coloration nor change in composition; and is completely impervious to any solvent vehicle for the solid medicament likely to be used, whether in a liquid or vaporized state.

Referring again to Fig. 1, it will be observed that tubular body 10 has been subjected to the action of a roller (not shown) having a pair of adjacent external annular ridges, while said body was in a suitably heated plastic condition, to cause indentation of the cylindrical side wall thereof and consequent formation of annular interior ridges which form relatively spaced partitioning walls 13 and 14 having needle-penetrable passages 15 and 16, respectively, in centrally disposed axial alignment. In the several figures of the drawing, the diameter of passages 15 and 16 is exaggerated in the interest of clear disclosure, whereas actually the diameter to accommodate hypodermic needles of any of the standard sizes is 2 to 4 mm.

Passages 15 and 16 are sealed hermetically by septa 17 and 18, respectively, composed of medically acceptable material, which are applied to partitioning walls 13 and 14 in a manner to be described presently.

The partitioning means constituted by walls 13 and 14 and septa 17 and 18, respectively, divides container body 10 into separate compartments 19 and 20 for reception of medicament M and the solvent vehicle S therefor. Partitioning walls 13 and 14 are axially spaced apart by a distance bearing a relation to the internal diameter of body 10, preferably of less axial extent than said diameter, calculated to provide an intervening pressure transmitting chamber 21 of volumetric capacity sufficient to afford the vapor absorption and pressure absorbing features of the present invention upon which I shall elaborate later herein.

Preparatory to installing the respective septa 17 and 18 in closing and hermetic sealing relation to passages 15 and 16 in partitioning walls 13 and 14, respectively, the medically acceptable material which has been chosen for use is first dissolved in a highly volatile solvent. If pyroxylin is to be used, it is dissolved in ether, and may be procured in this form on the market as "collodion." The substance which I now prefer, vinyl copolymer, is dissolved in a suitable highly volatile solvent, such as ethyl acetate or butyl acetate. The actual installation and conditioning of septa composed of vinyl copolymer will now be described by way of example.

The complete method comprises three consecutive steps, viz: (1) deposition of the liquefied vinyl copolymer on the respective partitioning walls in closing relation to the passages therein; (2) an air drying step; and (3) an oven-baking step.

Before describing the first step in detail, it should be mentioned that there are three factors which determine the behaviour of vinyl copolymer in formation of a sealing septum in adhesive union with glass, viz: (1) operating temperature; (2) viscosity, which varies in indirect proportion to temperature; and (3) surface tension, which varies in direct proportion to viscosity. Therefore, it is possible to control the viscosity and surface tension by varying the operating temperature. However, since it is usual to operate at "room temperature," a more practical mode of control is to vary the ratio of vinyl copolymer to its solvent and thereby regulate the viscosity, whose value is not critical but should lie within a rather narrow range, which is readily determinable. Whenever the solution is too highly viscous, more solvent may be added; if too thin, it may be made more viscous by evaporating a suitable percentage of the solvent by heating.

Depending upon whether the viscosity of the innocuous material is relatively high or relatively low within the limits of the acceptable range, the septa forming action will vary markedly, as will appear upon reference to Figs. 2 to 6 of the drawings.

In all of these views, the tubular container body 10 is shown in the axially vertical position which must be assumed for performance of the first step of the "drop method" of septa installation. Fig. 2 illustrates the manner in which a large drop D of vinyl copolymer is released from a decanting tube T positioned above the upper partitioning wall 13 with its mouth in alignment with the axis of the passage 15 therein. The height of release will vary in direct proportion to the viscosity of the material, as will appear presently. Drop D should be controlled in size so that the volume of material will be sufficient for production of the two septa for both wall passages.

Fig. 2 also represents the first stage of septa formation when the vinyl copolymer is of relatively high viscosity. In this instance, drop D will penetrate passage 15 after being deposited upon wall 13, if released from a sufficient height. Due to adhesion and surface tension, a portion $d'$ of drop D will remain in closing relation to passage 15, while a portion $d''$ will break off and fall (see arrows) onto wall 14 in closing relation to passage 16. Initially, drop portions $d'$ and $d''$ will be vertically thick and will spread over the upper surfaces of walls 15 and 16, respectively. In about 15 seconds time, due to the rapid evaporation of the solvent, both drop portions will have been shrunk to the size and form illustrated in Fig. 6, which represents the final stage at which the septa will be sufficiently adhered to the glass surfaces of body 10 to withstand handling of said body in performance of the second step of the complete method.

It should be remarked that in all of the views, the thickness of the films of vinyl copolymer clinging to the surfaces of body 10 and the thickness of the finished septa are greatly exaggerated. The actual thickness of each septum, for instance, is about 1 mm. Even so, the septum is so tough and resilient that it can withstand considerable axial pressure, particularly when combined with a second septum with an intervening pressure transmitting chamber.

In contradistinction to the behaviour of the vinyl copolymer of high viscosity as illustrated in Fig. 2, when on the contrary the viscosity is low, the action will be as depicted in Figs. 3, 4 and 5 before attaining the final condition in which the septa are completely formed. As shown first in Fig. 3, when large drop D penetrates upper wall passage 15 (which will occur even if released at a lower height than for the high viscosity material), it will tend to flow down the sides of pressure transmitting chamber 21 in a thin film (see arrows). In the manner depicted in Fig. 4, a portion $d''$ will reach lower wall 14 and will fill passage 16. As in the use of material of high viscosity, a portion $d'$ will remain in closing relation to passage 15 in upper wall 13. However, within a few seconds, the shrinking effect will have progressed to a degree wherein the coating of the walls of pressure transmitting chamber 21 will become reduced to extreme thinness, as shown in Fig. 5. The drop portions $d'$ and $d''$ will shrink steadily (see arrows) until the completed septa 17 and 18 represented in Fig. 6 have been formed, the only exception to this disclosure being the continued existence of the tenuous interconnecting wall coating (not shown).

After the septa are sufficiently stable in form (Fig. 6) to withstand handling of the container body, the second step in the method is performed, which consists in air-drying with a moving current of heated air for 10 to 15 minutes.

After that, the container body is subjected to the third step, which consists in oven-baking at a temperature of the order of 150 degrees F. for 20 minutes or longer. The temperature is not critical and may be as high as 240 degrees F., which is usual for sterilization.

The superior effectiveness of the plural septa when made of vinyl copolymer and of the intervening compression chamber has been proven in numerous ways. Samples of the air in pressure transmitting chamber 21 of a sterilized loaded container which has been subjected to long storage and violent motion have been analyzed and found to be completely sterile and non-toxic. The number of rejections of the improved containers for loosened and ruptured septa have been negligible. Moreover, as a result of tensile strength tests, in which graduated fluid pressure was applied to the solvent ingredient compartments of empty, uncapped containers, it is concluded that the plural septa with intervening pressure transmitting chamber can safely withstand surprisingly high pressures. Depending upon the septum diameter in each instance, the maximum safe pressures in excess of atmospheric pressure, which vary indirectly with increase in diameter, were found by test to be substantially as follows: 1 mm. diameter, 30 lbs. per sq. in.; 2 mm., 15 lbs. per sq. in.; 3 mm., 10 lbs. per sq. in.; and 4 mm., 5 lbs. per sq. in.

In this connection, it is the practice to subject newly made and loaded containers to a critical vapor transmission test, which consists in immersing them for 30 days in a bath of water which is maintained constantly at a temperature of 100 degrees F. A crystalline medicament is used for this test so that any transmission of vaporized solvent through the sealing septum will be visually evidenced by deliquescence of the medicament.

It is apparent that, when septum 17 is subjected to heat-generated increased pressure in compartment 20, the said septum is caused to bulge in the direction of pressure transmitting chamber 21 and thereby compress the air in said chamber. The pressure exerted by septum 17 on the air in pressure transmitting chamber 21 will be communicated to septum 18 at the opposite side of said chamber, with the result that the increased tension of the compressed air and of resilient septum 18 will combine to cushion the pressure on septum 17 and thereby prevent rupture of the latter. A further precautionary measure is the positioning of both septa on the sides of the respective partitioning walls facing solvent compartment 20, whereby pressure against septum 17 will press it into more firm contact with wall 13 instead of tending to tear it loose, such as would occur were the septum applied to the opposite side of the wall. Likewise, the pressure exerted by septum 17 on the air in pressure transmitting chamber 21 will pass septum 18 more tightly against wall 14. Septum 18 is additionally sustained by the interseptum wall film when low viscosity material has been used.

The shock absorption or load distribution action just described and the confinement of vapor transmission through septum 17 to the air contents of pressure transmitting chamber 21 in the case of a nitrocellulose material, or the total prevention of vapor transmission in the case of vinyl copolymer, are the principal advantages gained by the improved partitioning means.

Fig. 7 shows the double-septum, pressure transmitting chamber feature incorporated in a container body having a side wall and a bottom wall in closing relation to its lower end. The sealing septa for the respective wall passages 15 and 16 are represented as being in the form of liquid drop portions $d'$ and $d''$, respectively, which are still in a liquid state, to illustrate an interesting phenomenon which was observed during installation of septa in a container having one end permanently closed by a bottom wall integral with the side wall. A train of air bubbles passed at gradually diminishing speed through drop portion $d''$ and then drop portion $d'$ as the said drop portions became progressively more viscous in the solidification process. A single bubble would appear in drop portion $d''$ first and then burst through the inner surface of the same into pressure transmitting chamber 21. This would be followed immediately by the similar penetration of drop portion $d'$ by a single bubble which emerged into solvent compartment 20. In a few seconds, the movement of air bubbles ceased and drop portions $d'$ and $d''$ evolved into their sheet-like, solidified state in the form of the respective sealing septa 17 and 18.

Because the above-described phenomenon was not observed during installation of sealing septa in open-ended container bodies, it was concluded that excess pressure was being developed in closed compartment 19, so an experiment was performed with other container bodies having one end closed. Instead of using bodies that had been subjected to room temperature for some time, they were chilled in a refrigerator prior to the installation of the sealing septa. The result was that no bubble transfer occurred, thus proving the conclusion which had previously been reached. My considered conclusion is that the pressures in pressure transmitting chamber 21 and compartments 19 and 20 quickly reach a fair state of equilibrium during evaporation and evacuation from the container body of the solvent for the innocuous material regardless of whether the said body has both ends open or one end closed.

Based upon the foregoing conclusion and comparatively undistorted visual appearance of the sealing septa following completion of the oven-baking step of the septa installation method, it is further concluded that complete equalization of pressure in the pressure transmitting chamber and the ingredient compartments is effected through permeation of the respective septa during the earlier portion of the oven-baking step when the septa-forming material has not yet attained its final dense impervious condition.

In Fig. 8, the application of the present invention to the earlier container embodiment disclosed in Figs. 6 to 12, inclusive, of the drawings in my prior Patent No. 2,568,029, dated September 18, 1951, is illustrated. In this instance, outer bottle-type container section 21' is united telescopically with thimble-shaped inner container section 22 by needle-puncturable end cap 23. The side wall of inner container section 22 is provided with inpressed partitioning wall 13' closely adjacent to bottom wall 24. The needle-penetrable passage 15' in wall 13' and an aligned passage 25 in bottom wall 24 are sealed by septa 17 and 18, respectively, which have been installed by the "drop method" previously described and which are preferably composed of vinyl copolymer.

It has been remarked hereinbefore that rubber does not adhere to glass in a manner which can insure a satisfactory durable adhesive union between a sealing media and the walls of a glass container. For that reason, the rubber caps customarily amployed to seal the open ends of containers for hypodermic injection ingredients are subject to vapor transmission. In other words, their use is inconsistent with perfection of intercompartment sealing means. With this disparity in the effectiveness of the two types of sealing means in mind, my present invention is enlarged in scope to embrace use of vinyl copolymer in sealing the ends of a container in the manner illustrated by way of example in Fig. 9.

For at least two reasons, it is necessary to insert a tightly fitting backing plug 26, preferably made of rubber, in each open end of container body 10 before a sealing septum can be applied successfully. In the first place, if a mass of liquefied vinyl copolymer were deposited on the open tube end in any manner, it would either flow into the interior or become concentrated around the rim with no possibility of the formation of a septum spanning the container end as required. Secondly, even if a septum were formed by some method not presently conceivable, such an unsupported and exposed structure would be almost certain to be ruptured during normal handling incident to boxing, storage and shipment. The backing plug feature has solved the problem. After such a plug has been installed, the tube end is dipped in a bath of liquefied vinyl copolymer to coat the outer end of plug 26, the rim of the container end, and the adjacent portion of the outer peripheral surface of the container for about a quarter of an inch from the said end. The coating will adhere tenaciously to glass container and rubber plug and thereby provide a completely impervious sealing septum 27 which is securely anchored in position and firmly reinforced against accidental inward pressure.

Backing plug 26 should be partially bored for needle-penetration and to leave a thin closure wall 28 at its outer end for reinforcement of the central area of the septum.

It will be understood that it is intended to cover all changes and modifications of the examples of the invention herein chosen for the purpose of illustration which do not constitute departures from the spirit and scope of the invention.

Having thus described the invention, I claim:

1. A unitary container for separately packaging the related ingredients of a hypodermic injection charge comprising: a container body; and partitioning means dividing said body into separate compartments to contain the respective ingredients, said partitioning means being constructed and arranged to include a pair of septa of needle-puncturable, resilient, non-frangible material adhesively affixed to the walls of said body in relatively spaced positions to form a pressure transmitting chamber therebetween and to hermetically seal said chamber from said compartments.

2. A unitary container as defined in claim 1, wherein the container body is tubular in form and the compression chamber is of less axial extent than diameter so as to be of such volumetric capacity that pressure of either septum against the air contained within the pressure transmitting chamber will be communicated to the other septum and the tension of the first-mentioned septum will be cushioned by the tension applied to said chamber contents and to the second-mentioned septum.

3. A unitary container for separately packaging the related ingredients of a hypodermic injection charge comprising: a tubular container body having a pair of integral cross walls provided with needle-penetrable through passages; and a septum of needle-puncturable, resilient, non-frangible material adhesively affixed to each of said cross walls in hermetic sealing relation to the through passage therein, said cross walls and septa being relatively spaced to form a pressure transmitting chamber therebetween.

4. A new article of manufacture comprising: a tubular container body having inwardly projecting annular ridges formed therein in axially spaced relation to each other and to the ends of said body to form cross walls having central needle-penetrable passages which divide the body into main compartments and an intervening chamber; and a septum of needle-puncturable, resilient, non-frangible material adhesively affixed to each of the cross walls in hermetic sealing relation to the passage therein.

5. As a new article of manufacture, a tubular outer container section comprising a side wall and a bottom wall in closing relation to its lower end, the upper end of said outer container section being open to provide a filling mouth; a thimble-shaped inner container section comprising a side wall and a bottom wall at its lower end having a central reduced needle-penetrable passage, the upper end of said inner section being open to provide a filling mouth, said inner container section being removably assembled within the outer container section with its filling mouth upwardly facing in substantially lip-flush relation to the filling mouth of said outer container section, and the inner container section being of smaller volumetric size than the outer container section to provide a compartment between the bottom walls of both sections; means to support the inner container section in telescopically fitting assembled relation to the outer container section; and a cross wall provided in the inner container section in axially spaced relation to the bottom wall thereof to provide a chamber therebetween, said cross wall having a central reduced needle-penetrable passage.

6. A new article of manufacture as defined in claim 5, wherein a septum of needle-puncturable, resilient, non-frangible material is adhesively affixed to each of said cross and bottom walls of the inner container section in hermetic sealing relation to the through passage therein.

7. A unitary container for separately packaging the related ingredients of a hypodermic injection charge comprising: a container body; and partitioning means dividing said container body into separate compartments to contain the respective ingredients, said partitioning means including a compression chamber communicating with said compartments through connecting passages of needle-penetrable size, and a septum of needle-puncturable, resilient, non-frangible material adhesively affixed to each connecting passage of the compression chamber in hermetic sealing relation thereto.

8. A unitary container as defined in claim 1, wherein the material of which the respective septa are formed is vinyl copolymer.

9. A new article of manufacture as defined in claim 4, wherein each septum is composed of vinyl copolymer.

10. A unitary container for separately packaging the related ingredients of a hypodermic injection charge comprising: a tubular container body having at least one end open; partitioning means dividing said body into separate compartments to contain the respective ingredients and being constructed and arranged to provide a pair of septa of needle-puncturable, resilient, non-frangible material adhesively affixed to the walls of said body in relatively spaced positions to form a compression chamber therebetween and to hermetically seal said chamber from said compartments; and a needle-puncturable closure cap of resilient, non-frangible material removably applied to the open end of said container body.

11. A unitary container for separately packaging the related ingredients of a hypodermic injection charge comprising: a container body; and partitioning means dividing said body into separate compartments to contain the respective ingredients, said partitioning means being constructed and arranged to include a pair of needle-puncturable septa composed of a resilient, non-frangible material adhesively affixed to the walls of said body in relatively spaced positions to form a pressure transmitting chamber therebetween and to hermetically seal said chamber from said compartments.

References Cited in the file of this patent

UNITED STATES PATENTS

| 821,579 | Austen | May 22, 1906 |
| 2,093,567 | McCullough | Sept. 21, 1937 |
| 2,338,102 | Fields | Jan. 4, 1944 |
| 2,549,417 | Brown | Apr. 17, 1951 |
| 2,559,231 | Seemar | July 3, 1951 |
| 2,653,606 | Ryan | Sept. 29, 1953 |

FOREIGN PATENTS

| 80,904 | Sweden | July 10, 1934 |
| 619,320 | France | Dec. 29, 1926 |